United States Patent
Scott

[19]

[11] Patent Number: 5,868,812
[45] Date of Patent: Feb. 9, 1999

[54] METHOD AND APPARATUS FOR DELIVERING A CASED GLASS STREAM

[75] Inventor: Garrett L. Scott, Toledo, Ohio

[73] Assignee: Owens-Brockway Glass Container Inc., Toledo, Ohio

[21] Appl. No.: 717,040

[22] Filed: Sep. 20, 1996

[51] Int. Cl.[6] .............................. C03B 5/00; C03B 5/26; C03B 7/08
[52] U.S. Cl. .................. 65/121; 65/126; 65/128; 65/129; 65/145; 65/179; 65/326; 65/328; 65/330; 65/347
[58] Field of Search .................... 65/121, 122, 126, 65/128, 129, 135.1, 145, 146, 179, 180, 325, 326, 327, 328, 330, 346, 331, 347

[56] References Cited

U.S. PATENT DOCUMENTS

| | | | |
|---|---|---|---|
| 1,680,543 | 8/1928 | Howard | 65/128 |
| 1,812,534 | 6/1931 | Jewett | 65/128 |
| 1,828,217 | 10/1931 | Barker, Jr. | 65/326 |
| 1,953,407 | 4/1934 | Honiss | 65/326 |
| 1,999,744 | 4/1935 | Wadman | 65/128 |
| 2,139,770 | 12/1938 | Peiler et al. | 65/326 |
| 2,139,911 | 12/1938 | Peiler et al. | 65/326 |
| 2,282,554 | 5/1942 | Barker, Jr. | 65/128 |
| 2,340,729 | 2/1944 | Barker, Jr. | 65/128 |
| 2,539,145 | 1/1951 | Light | 65/128 |
| 2,623,330 | 12/1952 | Griffin | 65/327 |
| 3,160,492 | 12/1964 | Chapman et al. | 65/128 |
| 3,326,655 | 6/1967 | Penberthy | 65/128 |
| 3,508,904 | 4/1970 | Keefer | 65/128 |
| 3,554,726 | 1/1971 | Daly | 65/128 |
| 4,305,747 | 12/1981 | Kirkman et al. | 65/128 |
| 4,740,401 | 4/1988 | Barkhau et al. | 65/121 |

FOREIGN PATENT DOCUMENTS

| | | |
|---|---|---|
| 0 722 908 A2 | 7/1966 | European Pat. Off. . |
| 0 722 907 A2 | 7/1996 | European Pat. Off. . |

*Primary Examiner*—Steven P. Griffin

[57] ABSTRACT

Apparatus for forming a cased glass stream having an inner core glass surrounded by an outer casing glass includes a first orifice for receiving core glass from a first source. A second orifice is vertically spaced beneath and aligned with the first orifice, and is surrounded by an annular chamber that communicates with the second orifice through the gap between the first and second orifices. A spout delivers casing glass from a second source through a tube to the annular chamber in such a way that glass flows by gravity from the first and second sources through the orifices to form the cased glass stream. A plurality of gas burners are disposed in the spout above the glass pool. The casing glass delivery spout is configured for improved heat transfer to, and improved heat retention within, the casing glass pool within the spout. Specifically, the glass pool surface area is enlarged, and the glass pool depth is reduced. Free space above the glass pool is enlarged to accommodate gas flames from more burners, and to increase surface heat radiation into the glass pool. The housing that supports the spout is designed such that an annular spout support surface engages the spout radially outwardly of the spout opening(s) for reducing heat transfer to the housing from casing glass flowing through the opening.

15 Claims, 3 Drawing Sheets

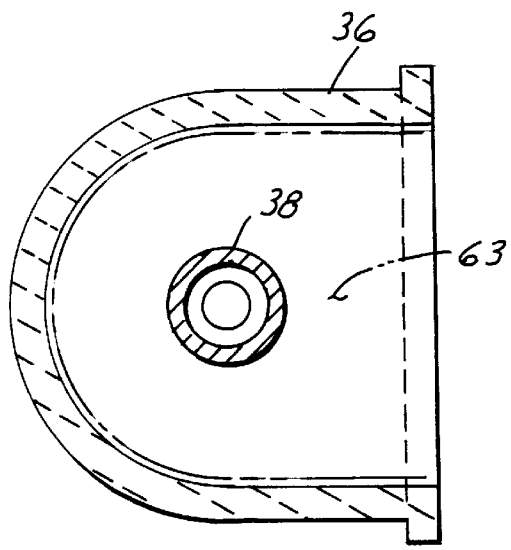
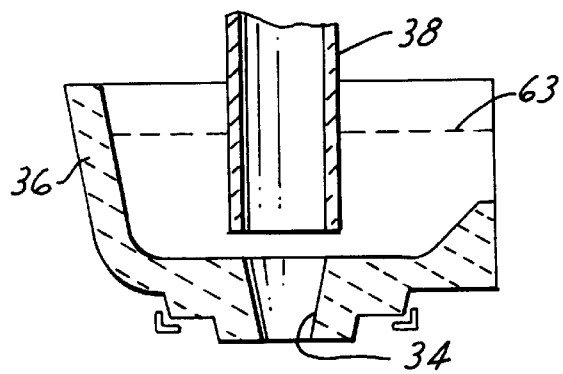
FIG.3
FIG.4A
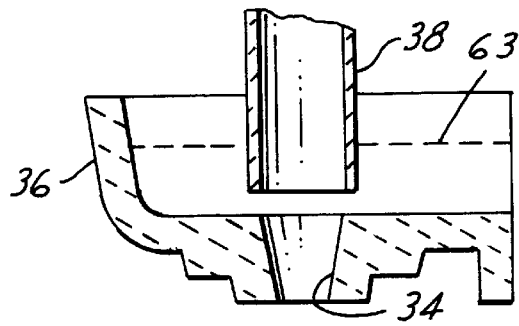
FIG.4B
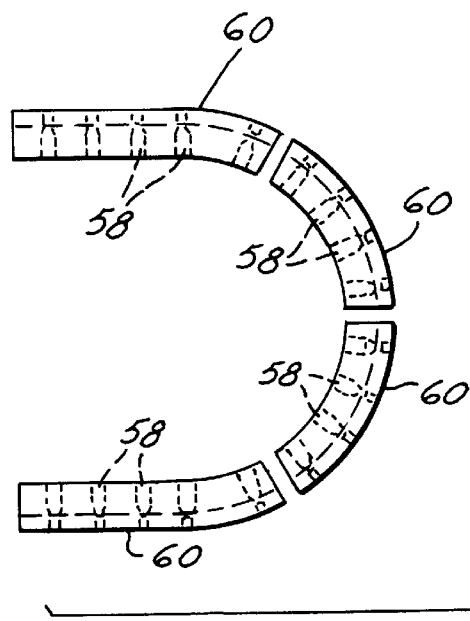
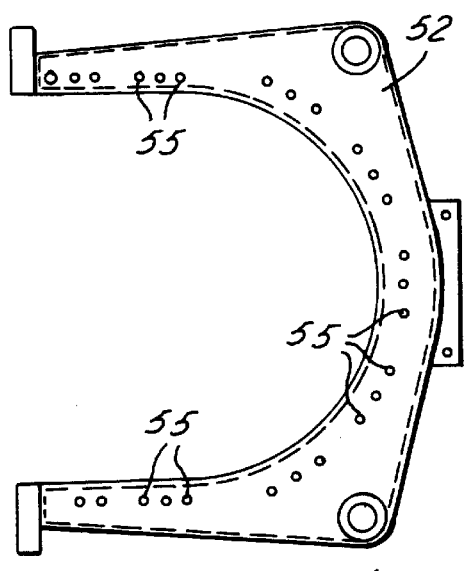
FIG.6

METHOD AND APPARATUS FOR DELIVERING A CASED GLASS STREAM

The present invention is directed to delivery of a glass stream for forming glass charges or gobs for glassware manufacture, and more particularly to a method and apparatus for delivering a so-called cased glass stream in which an inner or core glass is surrounded by an outer or casing glass layer.

BACKGROUND AND SUMMARY OF THE INVENTION

It has heretofore been proposed to provide a cased glass stream for forming glassware having layered wall segments. U.S. application Ser. Nos. 08/374,371 now abandoned (refiled as Ser. No. 08/787,061, now U.S. Pat. No. 5,776,221) and 08/374,372 now abandoned (refiled as Ser. No. 08/782,552), both assigned to the assignee hereof, disclose techniques for delivering such a cased glass stream in which core glass from a first source is delivered through a first orifice. A second orifice is vertically spaced beneath and aligned with the first orifice, and is surrounded by an annular chamber that communicates with the second orifice through the gap between the first and second orifices. A heated tube delivers casing glass from a second glass source to the annular chamber that surrounds the second orifice. Glass flows by force of gravity from the first and second sources through the first and second orifices in such a way that a cased glass stream emerges from the second orifice. This cased glass stream may be sheared by conventional techniques to form individual cased glass gobs for delivery to conventional individual section glassware forming machines.

Although the techniques disclosed in the noted patent applications address and overcome problems theretofore extant in the art, further improvements remain desirable. For example, since the casing glass layer is relatively thin, it is necessary that the casing glass delivery mechanism be capable of delivering glass at very low pull rates, such as on the order of five to ten tons per day. Furthermore, the casing glass delivery spout must be capable of arresting flow for an extended period of time, such as up to forty-five minutes during installation and start-up, without the flow control tube becoming frozen to the bottom of the spout. It has been proposed in the above-noted applications to provide an array of gas burners within the casing glass spout above the glass pool for both convection and radiant heating of the glass pool in an effort to maintain an elevated glass temperature. These prior art constructions operate satisfactorily during normal operation, but are not as efficient as desired during start-up or periods of non-use. It is therefore a general object of the present invention to provide a method and apparatus of the described character for delivering a cased glass stream in which the casing glass delivery spout is adapted to deliver glass at very low pull rate, including a zero flow pull rate, for an extended period of time without freezing or malfunction.

In general, the foregoing and other objectives of the present invention are accomplished by configuring the casing glass delivery spout for improved heat transfer to, and improved heat retention within, the casing glass pool or bath within the spout. To accomplish this, a number of structural and functional improvements are implemented as compared with conventional glass spout designs. Specifically, in a casing glass spout having one or more spout tubes for controlling glass flow through one or more spout openings, the ratio of the glass pool surface area occupied by the spout tube(s) to the actual overall casing glass pool surface area is not more than 15%, more preferably not more than 10%, and most preferably about 8%. This enlarged glass pool surface area, as compared with ratios on the order of 25% to 27% in conventional spout designs, promotes heat transfer into the glass pool, both directly from the gas burners and from the radiant walls of the spout and covers above the glass pool. Depth of the glass pool is also reduced as compared with conventional spouts to promote heat transfer from the pool surface through the pool to the glass surrounding the spout opening. The ratio of pool surface area to pool depth in the preferred embodiments of the invention is at least 50/1, and more preferably at least 75/1, as compared with conventional ratios on the order of 28/1 to 32/1.

Furthermore, in accordance with another aspect of the present invention, the free space above the glass pool is enlarged so as to provide more volume for gas combustion without contact of gas flames with the pool surface, and a greater area for heat transfer by radiation from the spout sidewall and cover to the surface of the glass pool. The number of gas burner ports is increased for additional heat transfer into the glass pool. The housing that supports the casing glass spout is designed such that an annular spout support surface engages the spout radially outwardly of the spout opening(s) for reducing heat transfer from casing glass flowing through the opening. Increased insulation is disposed between the outer wall surface of the casing glass spout and the inner wall surface of the housing for further reduction of heat transfer.

BRIEF DESCRIPTION OF THE DRAWINGS

The invention, together with additional object, features and advantages thereof, will be best understood from the following description, the appended claims and the accompanying drawings in which:

FIG. 3 is a schematic plan view of the casing glass delivery spout in FIG. 1 comparing the actual glass pool surface area to the portion of the surface area occupied by the spout tube;

FIGS. 4A and 4B are fragmentary schematic diagrams that illustrate casing glass pool depth in accordance with the present invention;

FIG. 6 is an exploded view of a portion of the gas burner mechanism illustrated in FIG. 5.

DETAILED DESCRIPTION OF PREFERRED EMBODIMENTS

Figure 1:
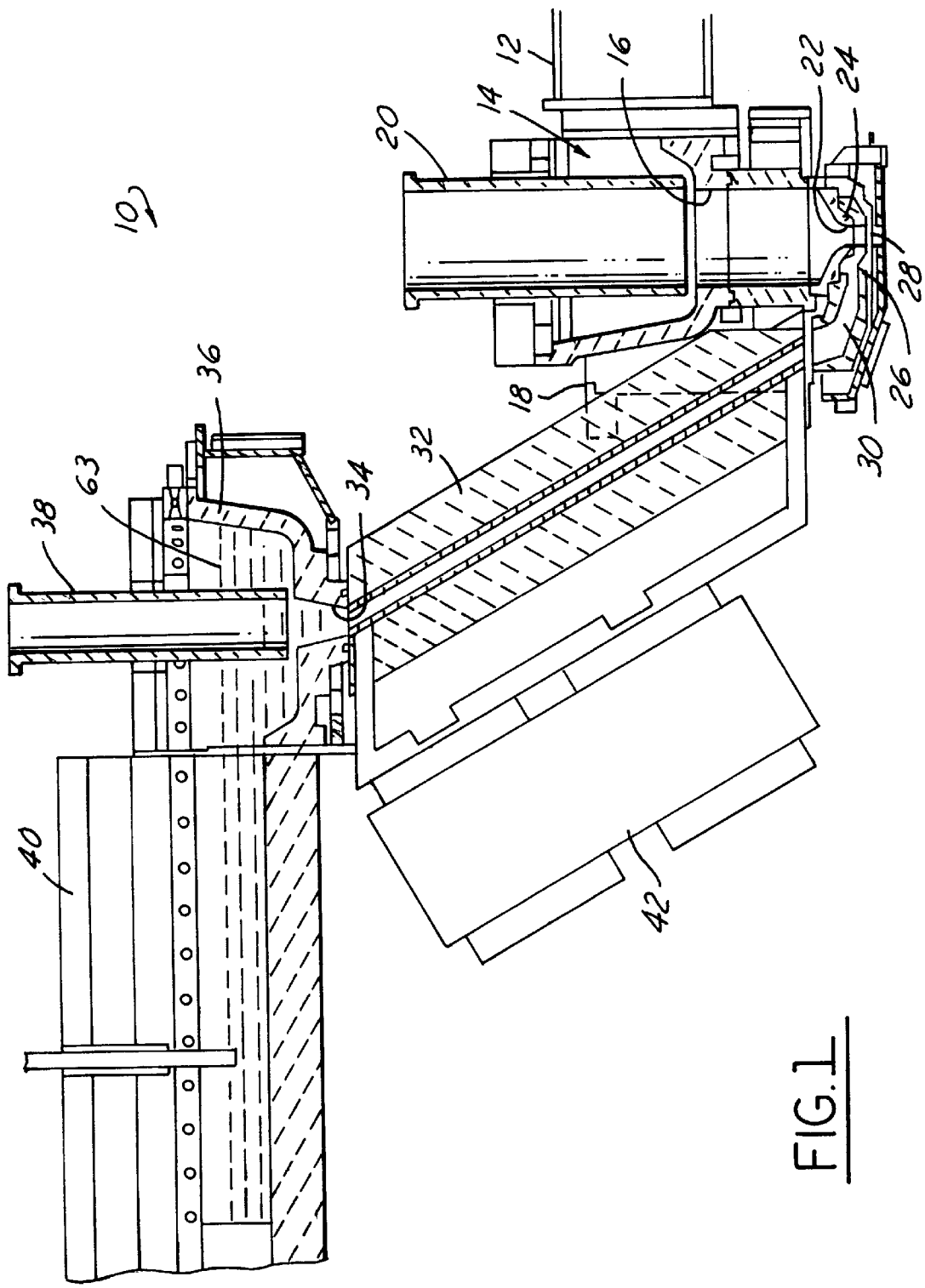
FIG. 1 is a fragmentary elevational schematic diagram of a glass delivery system in accordance with a presently preferred embodiment of the invention.

FIG. 1 illustrates a system 10 for delivering a stream of cased glass. A first forehearth 12 delivers core glass to a spout 14 that has at least one opening 16 (usually several openings) at the lower end thereof. Spout 14 is surrounded by a protective case 18, preferably constructed of non-magnetic metal such as stainless steel. A tube 20 controls delivery of core glass from spout 14 through opening 16 to and through a first orifice 22 carried by an upper orifice ring 24 beneath spout 14. A lower orifice ring 26 carries a second orifice 28 positioned beneath orifice 22 and axially aligned therewith. Orifice 28 is surrounded by an annular chamber 30 formed between orifice rings 24, 26. Chamber 30 communicates with orifice 28 by means of a lateral space or gap between orifices 22, 28. Annular chamber 30 is coupled by a delivery tube 32 to the opening 34 at the lower end or base of a casing glass spout 36. Spout 36 includes a delivery control tube 38, and is coupled to a casing glass forehearth 40. Delivery tube 32 is resistance heated by control electronics 42 for maintaining flow of casing glass to chamber 30. To the extent thus far described, system 10 in FIG. 1 is essentially the same as disclosed in above-noted U.S. application Ser. Nos. 08/374,371 now abandoned (refiled as Ser. No. 08/787,061 now U.S. Pat. No. 5,776,221) and 08/374,372 now abandoned. The former of such applications is directed in particular to construction of casing glass delivery tube 32, while the latter of such applications is directed in particular to construction of orifice rings 24, 26. The disclosures of such applications, both of which are assigned to the assignee hereof, are incorporated herein by reference for purposes of background.

In conventional glass delivery spout designs, flow is stopped by temporarily lowering the spout tube so that it contacts the bottom of the spout. While the flow is stopped, the orifice ring is externally plugged or is replaced with an orifice having no openings. The spout tube is then raised off of the spout bottom. This must be accomplished within a few minutes to keep the spout tube from freezing to the spout bottom. To prevent such freezing, it is conventional practice to raise the tube periodically during the orifice change to flush fresh hot glass through the spout and re-warm the exit hole. Once the spout is capped and the tube raised, convection of glass will keep the bottom glass within the spout fluid enough to reestablish flow at some later time when the external plugs are removed. However, in casing glass system 10 illustrated in FIG. 1, the exit end of casing glass spout 36 is joined to delivery tube 32, and thus not exposed for plugging or replacement. Hence, flow control tube 38 and control 39 (FIG. 2) provide the only means for stopping casing glass flow. It has been found through implementation of the present invention to be described that spout tube 38 may be rested on the bottom of spout 36 for over forty-five minutes without freezing, and thereafter raised to successfully reopen the spout for glass flow.

Figure 2:
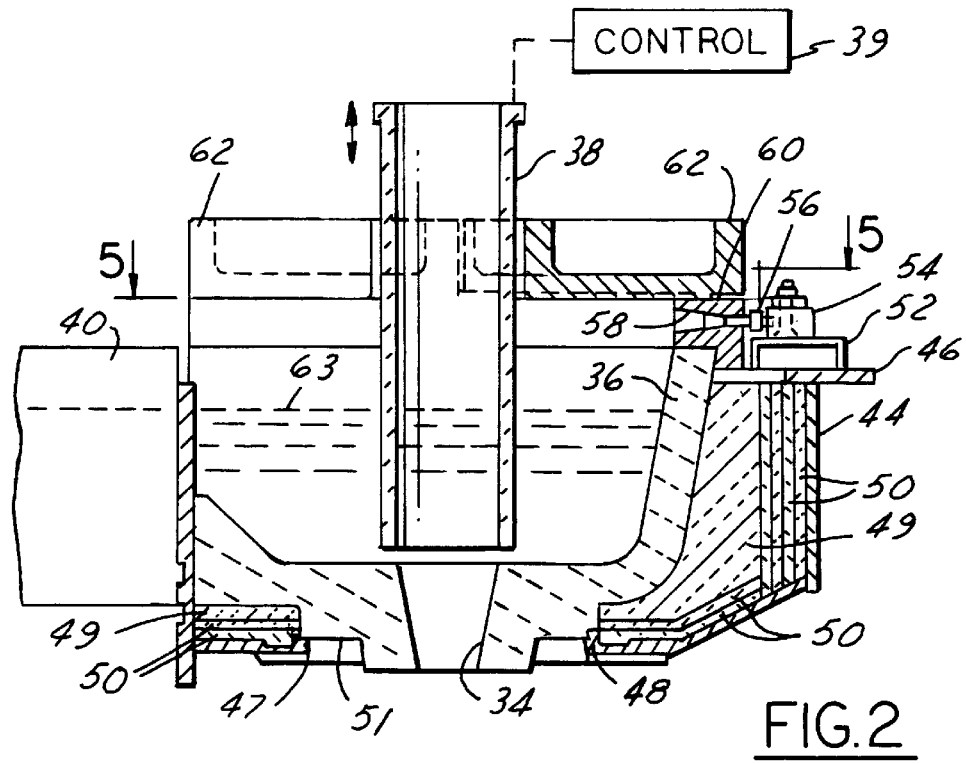
FIG. 2 is a fragmentary sectional view on an enlarged scale of the casing glass delivery spout in the system of FIG. 1.

Casing glass spout 36 is illustrated in greater detail in FIG. 2. Spout 36 is surrounded by an outer housing 44 of metal such as steel. Housing 44 has an upper ledge 46 and a lower support ring 48. Support ring 48 engages and supports the lower end of spout 36 at a position spaced radially outwardly from the casing glass spout opening(s) 34 so as to minimize heat transfer between the casing glass flowing through opening 34 and housing 44. Specifically, support ring 48 has an upwardly extending annular flange 47 with a shoulder that engages and supports the radially outer edge of a table 51 that surrounds spout opening 34. There is thus a minimum area of contact between ring 48 and spout 36, reducing heat transfer therebetween. Support ring 48 is of a construction to reduce heat transfer therethrough. The volume or air space between spout 36 and housing 44 is filled with high-efficiency insulating material, such as multiple layers 50 of insulating material marketed under the trademark MICROTHERM and the remainder filled with aggregate insulation 49.

Upper edge 46 of case 44 supports a gas manifold 52 (FIGS. 2, 5 and 6) that is connected to a source of gas not shown. A plurality of burner elbows 54 (FIG. 2) extend from corresponding openings 55 (FIG. 6) in manifold 52, and are respectively coupled to corresponding gas nozzles 56. Each gas nozzle 56 extends radially inwardly to engage a corresponding nozzle opening 58, which are collectively disposed in an array around four burner blocks 60. Burner blocks 60 are supported on the upper edge of casing glass spout 36 so that the gas flames extend radially inwardly over the pool or bath of glass in spout 36. A series of cover blocks 62 are supported by burner blocks 60 and close the upper end of spout 36. Spout 36 and cover blocks 62 are of ceramic construction for absorbing heat from the gas flames and re-radiating the heat toward the glass pool surface 63 within spout 36. Thus, the heat necessary to maintain molten glass temperatures within spout 36 comes from two sources, the gas burners over the spout area and the latent heat of the glass delivered from forehearth 40, typically at a temperature of 2000° to 2300° F. If this glass were flowing at sufficiently high rate through spout 36, no additional heating would be necessary. However, because of the very low pull rates involved in flow of casing glass, additional heat is provided by means of the gas burners (in addition to heat applied to delivery tube 32 by electronics 42). Heat supplied by the gas burners offsets heat losses and minimizes variations in temperature due to changes in glass flow. The burner flames generate heat over the bath of molten glass in the free space between molten glass surface 63 and cover blocks 62. The burner flames should not impinge directly on the surface of the molten glass, which might cause the undesirable generation of bubbles.

FIG. 3 illustrates exposed surface area of the glass pool within spout 36 as compared with the surface area occupied by spout tube 38. In accordance with one aspect of the present invention, the ratio of the surface area occupied by tube 38 to the actual surface area of the glass pool within spout 36 (i.e., excluding the tube area) does not exceed 15%, more preferably does not exceed 10%, and most preferably is about 8%. In the specific example illustrated in FIG. 3, the area occupied by tube 38 is 33 square inches, while the molten bath surface area within spout 36 surrounding but not including tube 38 is 401 square inches, a ratio of about 8.2%. These preferred ratios compare with ratios of about 24%, to 27% typical in conventional spouts. Increasing the surface area of the molten glass bath relative to the volume of the bath increases the efficiency of radiative heating of the glass bath.

In accordance with another feature of the present invention illustrated in FIGS. 4A and 4B, the depth of the glass bath is reduced as compared with the prior art. This improves heat transfer from glass surface 63 to the bottom of the spout 36. The ratio of the glass surface area (excluding tube 38) to glass depth preferably is at least 50/1, and most preferably at least 75/1. (All ratios are based upon measurements in like units, such as square inches to square inches, square inches to inches, etc.) In the example illustrated in FIG. 4A, the glass bath or pool has a surface area of 401 square inches and a depth of 7.5 inches, resulting in a ratio of about 53.5/1. In the example of FIG. 4B, the ratio of the 401 square inch surface area to a depth of 4.25 inches is about 94.4/1.

Figure 5:
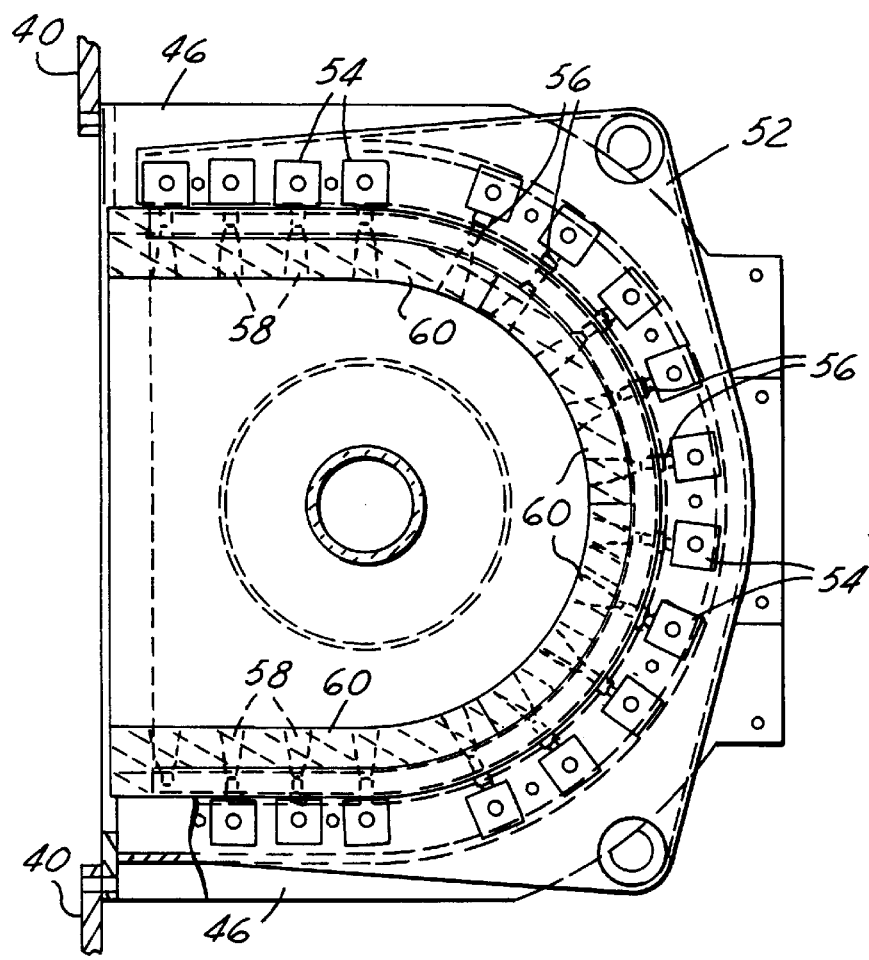
FIG. 5 is a sectional view taken substantially along the line 5—5 in FIG. 2.

Decreasing the depth of the glass pool as discussed immediately above has the additional advantage, in accordance with another aspect of the present invention, of increasing the free space above the glass pool for gas combustion and heating. By increasing the free space, the sidewalls of the spout become exposed and cooperate with the cover blocks to contribute to radiative surface heating of the glass bath. That is, there is additional surface area for absorption of heat from the burner flames, and corresponding additional surface area for re-radiation of heat to the glass pool surface. In the configurations illustrated in FIGS. 4A and 4B, the free space between the glass pool surface and the upper edge of the spout is 5 3/8 inches, versus 3 3/8 inches typical of the prior art. The combined radiative area (cover blocks plus sidewalls) is 697 square inches, versus about 250 to about 475 square inches in the prior art. The ratio of the total radiative surface area to the surface area of the glass pool is preferably at least 1.7/1. As shown in FIG. 5 and 6, the casing glass spout design of the present invention preferably has eighteen gas burner ports, as compared with ten to fourteen burner ports in corresponding conventional designs. This represents a 28% increase in burner capacity over the ten-burner design. The ratio of the free radiative surface area (sidewalls plus cover blocks) to burner ports is thus about 38.7, as compared with ratios in the range from about 25 to 34 with conventional designs, the ratio should preferably be at least 35/1. The burner ports preferably are disposed at least five inches above surface 63. As compared with conventional constructions having a spout 36 of similar radius, the radius of housing 44 is increased almost 10%, providing about a 30% increase in volume for insulation 50, 49.

I claim:

1. Apparatus for forming a cased glass stream having an inner core glass surrounded by an outer casing glass, said apparatus including means for delivering core glass from a first source through a first orifice, means forming a second orifice vertically spaced beneath and aligned with said first orifice with an annular chamber surrounding said second orifice and communicating with said second orifice through a gap between said first and second orifices, and means for delivering casing glass from a second source to said annular chamber such that glass flows by gravity through said orifices from said sources to form said cased glass stream, said means for delivering casing glass from a second source comprising a spout for receiving and holding casing glass in a pool having an exposed upper first surface area, said spout having a lower opening, a spout tube disposed within said spout for movement within said pool away from and toward said lower opening to open and close said opening, said tube occupying a second surface area at the surface of said pool, a delivery tube extending from said spout lower opening to deliver casing glass to said annular chamber, and a plurality of heating means disposed around said spout above said pool for heating said pool, said second surface area having a ratio to said first surface area not exceeding 15%.

2. The apparatus set forth in claim 1 wherein said ratio is not more than 10%.

3. The apparatus set forth in claim 2 wherein said ratio is about 8%.

4. The apparatus set forth in claim 1 wherein said means for delivering casing glass from a second source is constructed such that said pool in said spout has a glass depth such that the ratio of said first surface area in square inches to said glass depth in inches is at least 50/1.

5. The apparatus set forth in claim 4 wherein said ratio of said first surface area in square inches to said glass depth in inches is at least 75/1.

6. The apparatus set forth in claim 4 wherein said spout has a sidewall and a cover overlying said pool, and wherein said spout has a free surface area of said sidewall and said cover over said pool with a ratio to said first surface area of at least 1.7/1.

7. The apparatus set forth in claim 6 wherein said heating means comprises a plurality of gas burners having ports above said pool, said free surface area in square inches having a ratio to the number of said burner ports of at least 35/1.

8. The apparatus set forth in claim 7 wherein said ports are disposed above said exposed upper first surface area of said pool by a distance of at least five inches.

9. The apparatus set forth in claim 1 wherein said means for delivering casing glass from a second source further comprises means for supporting said spout, including a case surrounding said spout and forming an annular spout support surface that engages said spout radially outwardly of said lower opening for reducing heat transfer to said case from casing glass flowing through said opening.

10. A method of forming a cased glass stream in which glass from first and second sources is delivered to a pair of aligned orifices in such a way that glass from the second source forms a casing around an inner core of glass from the first source, wherein glass is delivered from said second source by:

(a) forming a spout having a sidewall and a base with an opening through which glass flows from said second source, (b) positioning a spout tube within said spout for movement toward and away from said opening, (c) regulating flow of glass through said opening so as to form a pool of casing glass within said spout around said tube, (d) delivering heat to said glass pool from above said pool within said spout, and (e) dimensioning said spout with respect to said tube such that said glass pool has a first surface area excluding said tube and said tube occupies a second surface area at a ratio of not more than 15% to said first surface area.

11. The method set forth in claim 10 wherein said ratio is not more than 10%.

12. The method set forth in claim 11 wherein said ratio is about 8%.

13. The method set forth in claim 10 wherein said step (c) comprises the step of regulating glass flow such that said pool has a depth in inches beneath said first surface area not more than 1/50 of said first surface area in square inches.

14. The method set forth in claim 13 wherein said ratio of said depth in inches to said surface area in square inches is not more than 1/75.

15. The method set forth in claim 13 wherein said spout has a cover overlying said sidewall and said pool, said spout sidewall and cover defining a free spout surface area over said pool with a ratio to said first surface area of at least 1.7/1.

* * * * *